US011921854B2

(12) United States Patent
Kulaga et al.

(10) Patent No.: US 11,921,854 B2
(45) Date of Patent: Mar. 5, 2024

(54) MALWARE DETECTION QUALITY CONTROL

(71) Applicant: Acronis International GmbH, Schaffhausen (CH)

(72) Inventors: Andrey Kulaga, Moscow (RU); Nikolay Balakin, Abakan (RU); Nikolay Grebennikov, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 297 days.

(21) Appl. No.: 17/304,943

(22) Filed: Jun. 29, 2021

(65) Prior Publication Data

US 2022/0414215 A1     Dec. 29, 2022

(51) Int. Cl.
*H04L 29/06*     (2006.01)
*G06F 11/36*     (2006.01)
*G06F 21/56*     (2013.01)

(52) U.S. Cl.
CPC .......... *G06F 21/56* (2013.01); *G06F 11/3692* (2013.01)

(58) Field of Classification Search
CPC .............................. G06F 21/56; G06F 11/3692
See application file for complete search history.

(56) References Cited

U.S. PATENT DOCUMENTS

| 7,290,275 | B2 | 10/2007 | Baudoin et al. |
| 7,836,499 | B1 * | 11/2010 | Hernacki ............ H04L 63/0227 713/188 |
| 8,311,794 | B2 * | 11/2012 | Saterdag ............. G06F 11/3664 714/724 |
| 9,876,635 | B2 | 1/2018 | Bektchiev et al. |

(Continued)

FOREIGN PATENT DOCUMENTS

| CA | 2804258 A1 * | 1/2012 | ............ G06F 21/52 |
| CN | 110392024 | 10/2019 | |

OTHER PUBLICATIONS

Christodorescu, Mihai, and Somesh Jha. "Testing malware detectors." ACM SIGSOFT Software Engineering Notes 29.4 (2004): 34-44. (Year: 2004).*

(Continued)

*Primary Examiner* — Shawnchoy Rahman
(74) *Attorney, Agent, or Firm* — ESPE Legal Consultancy FZ-LLC

(57) ABSTRACT

A method of continuous development of an internal threat scan engine based on an iterative quality assessment includes iteratively performing a dynamic assessment of a quality of a threat detection with a frequency defined for each of objects in an object collection, wherein a result of the dynamic assessment includes internal and external scan results of the objects and a consistency verdict of the internal and external scan results of the objects, changing a frequency of scanning iteration of the objects based on the consistency verdict of the external and internal scan results (Continued)

of the objects, classifying the objects based on the result of the dynamic assessment, and creating a development task including the internal and external scan results of the objects, meta-data of the objects, and automated test results to provide details for developing a software to fix inconsistency of the internal and external scan results.

20 Claims, 4 Drawing Sheets

(56) References Cited

U.S. PATENT DOCUMENTS

| | | | |
|---|---|---|---|
| 9,967,264 | B2 | 5/2018 | Harris et al. |
| 10,574,687 | B1 * | 2/2020 | Lasser ................ H04L 63/1433 |
| 11,012,449 | B2 | 7/2021 | Kostyushko et al. |
| 11,070,570 | B2 | 7/2021 | Kostyushko et al. |
| 11,095,677 | B2 | 8/2021 | Steele et al. |
| 11,316,861 | B2 | 4/2022 | Gupta |
| 2015/0281260 | A1 | 10/2015 | Arcamone et al. |
| 2016/0078365 | A1 * | 3/2016 | Baumard ............ H04L 63/1425 |
| | | | 706/12 |
| 2017/0293758 | A1 | 10/2017 | Saxena et al. |

OTHER PUBLICATIONS

Abou El Kalam, A., Gad El Rab, M., & Deswarte, Y. (2014). A model-driven approach for experimental evaluation of intrusion detection systems. Security and Communication Networks, 7(11), 1955-1973. doi:https://doi.org/10.1002/sec.911 (Year: 2014).*

European Search Report EP22020266, dated Nov. 24, 2022.

Anonymous: "4 thinqs you should know about testing AV software with VirusTotal's free online multiscanner", May 18, 2021 (May 18, 2021), pp. 1-10, XP05598110.3, Retrieved from the Internet: URL:https://www.malwarebytes.com/loq/news /2021/05/4-thinqs-you-shou].d-know-about-testinq-av-software-with-virustotal [retrieved on Nov. 14, 2022].

Peng Peng PengP17@VT Edu et al: "Opening the BlackBox of VirusTotal Analyzinq Online Phishinq Scan Enqines", Proceedings of the Internet Measurement Conference, ACMPUB27, New York, NY, USA, Oct. 21, 2019 (Oct. 21, 2019), pp. 478-485, XP058480730, DOI: 10.1145/3355369.3355585 ISBN: 978-1-4503-6948-0.

* cited by examiner

MALWARE DETECTION QUALITY CONTROL

TECHNICAL FIELD

The invention pertains to computer security including quality control system and method for antivirus engines.

BACKGROUND

A key indicator of a quality of a security product is the level of threat detection, which conventionally is evaluated using specific test collections of files and objects, such as hyperlinks, depending on the type of a detection engine.

Testing is a part of a release cycle of a security application and is conducted at specific stages in the release of the application. After the release of applications, the product is tested either for benchmarking by test laboratories, or to check for errors when releasing new versions of detecting databases, such that there are no false positives or errors that affect the performance of the product.

This approach controls the quality of the product only at certain points in time and does not allow monitoring the quality of detection in real time.

In addition to the product testing procedure, the quality of detection is also influenced by the sources of files, URLs, and other objects that are used to populate the database of threats and clean files. The quality of these collections (i.e., confidence in the classification of objects in the collection, the size of the collection, and the number of new previously unknown files in the collection) directly determines the level of false positives, the level of detection, and the system performance by optimizing the work of filtering techniques of detectors, which can reduce time-consuming operations for dynamic analysis of objects on end machines of users.

In conventional methods and systems, testing of the quality of detection of threats by engines are carried out without assessing dynamics of quality indicators in comparison with third-party solutions and services, which would not allow performing an in time relative assessment of the quality of detection and identifying areas for improvement.

In such systems and methods, it is required to manually obtain various collections of objects and carry out tests on the objects, which would not necessarily provide an objective assessment and a result to allow moving on to improve the products without additional analysis.

Thus, it is necessary to solve the problem of dynamic analysis of detection metrics for various versions of products, decoding engines, and file collection sources, to manage the process of filling the detection databases and to update products with fixes in the detection mechanisms.

SUMMARY

It is an exemplary feature of the present invention to provide iterative dynamic assessment of a quality of detection by periodically scanning objects from collections of various sources with each supported product and/or scanning engine and comparing verdicts with the verdicts of third-party scanning services.

Based on the results of the assessment, the level of trust in the sources of collections is determined, and the classes of objects that are detected by products and engines with a quality level lower than the supporter of services are allocated, and a task is created for adjusting the rules for detection engines and products. The process is repeated cyclically to achieve a specified quality of threat detection.

The exemplary invention provides a method of continuous development of an internal threat scan engine based on an iterative quality assessment.

The method includes iteratively performing a dynamic assessment of a quality of a threat detection with a frequency defined for each of objects in an object collection, wherein a result of the dynamic assessment includes internal and external scan results of the objects and a consistency verdict of the internal and external scan results of the objects, changing a frequency of scanning iteration of the objects based on the consistency verdict of the external and internal scan results of the objects, classifying the objects based on the result of the dynamic assessment, creating a development task including the internal and external scan results of the objects, meta-data of the objects, and automated test results to provide details for developing a software to fix inconsistency of the internal and external scan results of the objects, controlling the dynamic assessment in accordance with a dynamic of implementation of the development task, and maintaining the quality of the threat detection on a given level based on the controlled dynamic assessment and a priority of the development task.

The exemplary invention also provides a system for continuous development of an internal threat scan engine based on an iterative quality assessment.

The system includes a processor coupled to a memory storing instructions. The processor is configured to iteratively perform a dynamic assessment of a quality of a threat detection with a frequency defined for each of objects in an object collection, wherein a result of the dynamic assessment includes internal and external scan results of the objects and a consistency verdict of the internal and external scan results of the objects, change a frequency of scanning iteration of the objects based on the consistency verdict of the external and internal scan results of the objects, classify the objects based on the result of the dynamic assessment, create a development task including the internal and external scan results of the objects, meta-data of the objects, and automated test results to provide details for developing a software to fix inconsistency of the internal and external scan results of the objects, control the dynamic assessment in accordance with a dynamic of implementation of the development task, and maintain the quality of the threat detection on a given level based on the controlled dynamic assessment and a priority of the development task.

The exemplary system is able to classify the objects that are detected with a worse quality and to speed and prioritize iteratively improving the quality. Further, it would be possible to test the detecting databases and the engine, taking into account the level of trust in collections of objects from individual sources and to individual classes of objects.

SUMMARY OF FIGURES

The exemplary aspects of the invention will be better understood from the following detailed description of the exemplary embodiments of the invention with reference to the drawings.

DETAILED DESCRIPTION

Exemplary embodiments of the invention will now be described with reference to the drawings.

Figure 1:
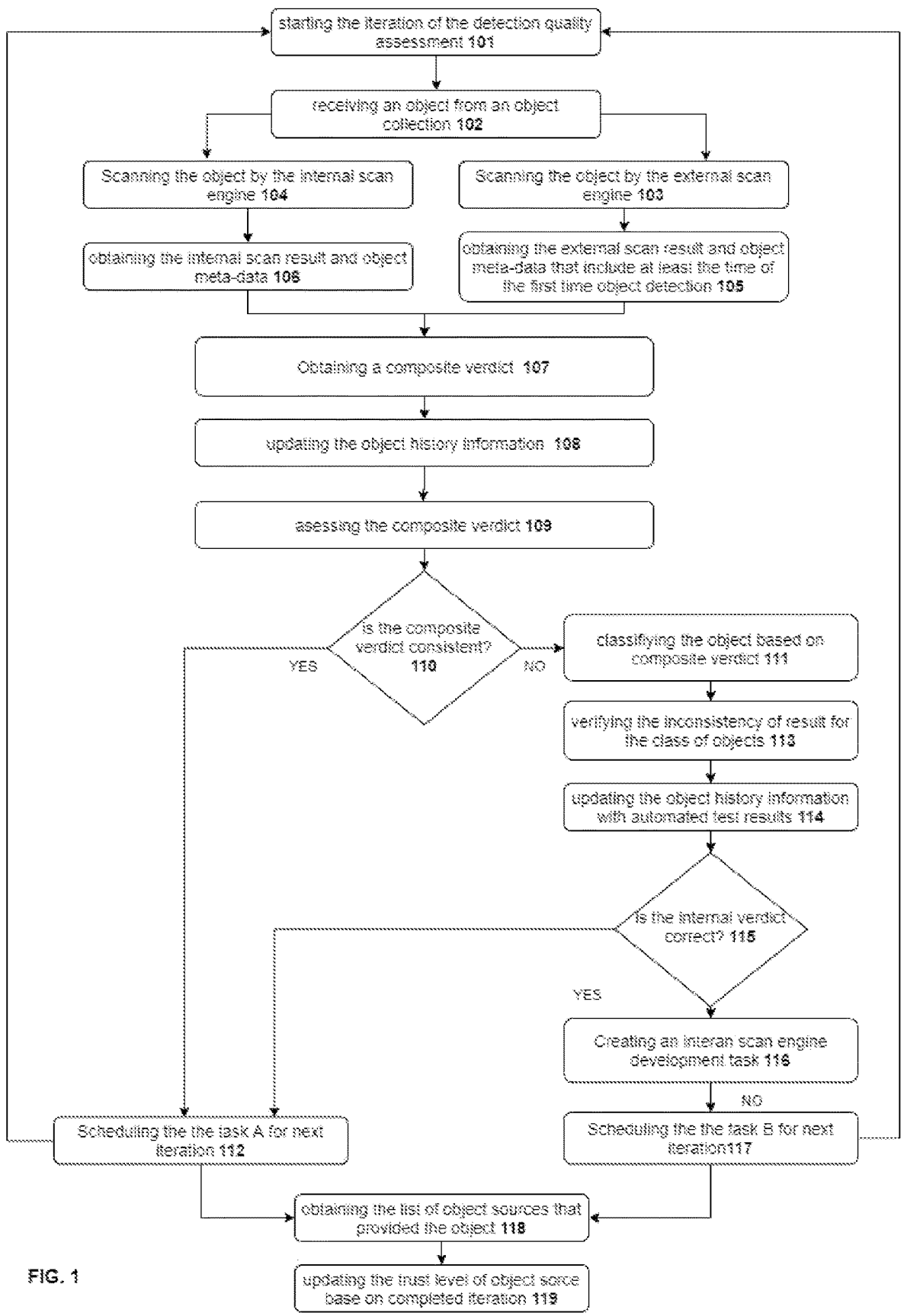
FIG. 1 is a flowchart showing an exemplary procedure for iteration of the detection quality assessment according to the exemplary embodiment.

As shown exemplarily in FIG. 1, the process 101 for the iteration of the detection quality assessment includes receiving an object from an object collection as shown in step 102. The object is scanned by an internal scan engine in step 104 and by an external scan engine in step 103.

In step 105, the external scan result and object metadata that include at least the time of the first time object detection are obtained, and in step 106, the internal scan result and object metadata are obtained.

Metadata may, for example, be related to VirusTotal, which includes a full list of engines in use, a list of existing privileges, etc. Metadata can be used for object classification, since the metadata is included in a scan result fully or partly.

In step 107, a composite verdict including the results of internal and external scans and object meta-data from internal and external scan engines is obtained.

Step 108 includes updating the object history information with the composite verdict of iteration, and the composite verdict is assessed at step 109.

When the composite verdict is determined to be consistent in step 110, a task "A" is scheduled for the next iteration in step 112, a list of object sources that provided the object is obtained in step 118, and the trust level of object source, based on the completed iteration, is updated in step 119.

The composite verdict is determined to be inconsistent when some pairs of verdict attributes are not equal. For example, scanning verdicts (e.g., malicious or black, suspicious, or grey and white) differ, or security rating (a number) also differ, or the class of threat is different (trojan or virus or ransomware), or meta-data contain additional data, etc.

When the composite verdict is determined to be inconsistent in step 110, the object is classified with other objects within collection based on a composite verdict in step 111, automated tests to verify the inconsistency of result for the class of objects is conducted in step 113, and in step 114, the object history information with automated test results is updated.

When the internal verdict is determined to be correct in step 115, the process proceeds to step 112 to schedule the task "B" for the next iteration. Scheduled time, scope of external and internal engines and object collections are set for task "A" and "B" independently.

When the internal verdict is determined to be incorrect in step 115, a scan engine development task with a composite verdict and automated test results are created in step 116, and a task is scheduled for the next iteration in step 117 by obtaining a list of object sources that provided the object in step 118.

Figure 2:
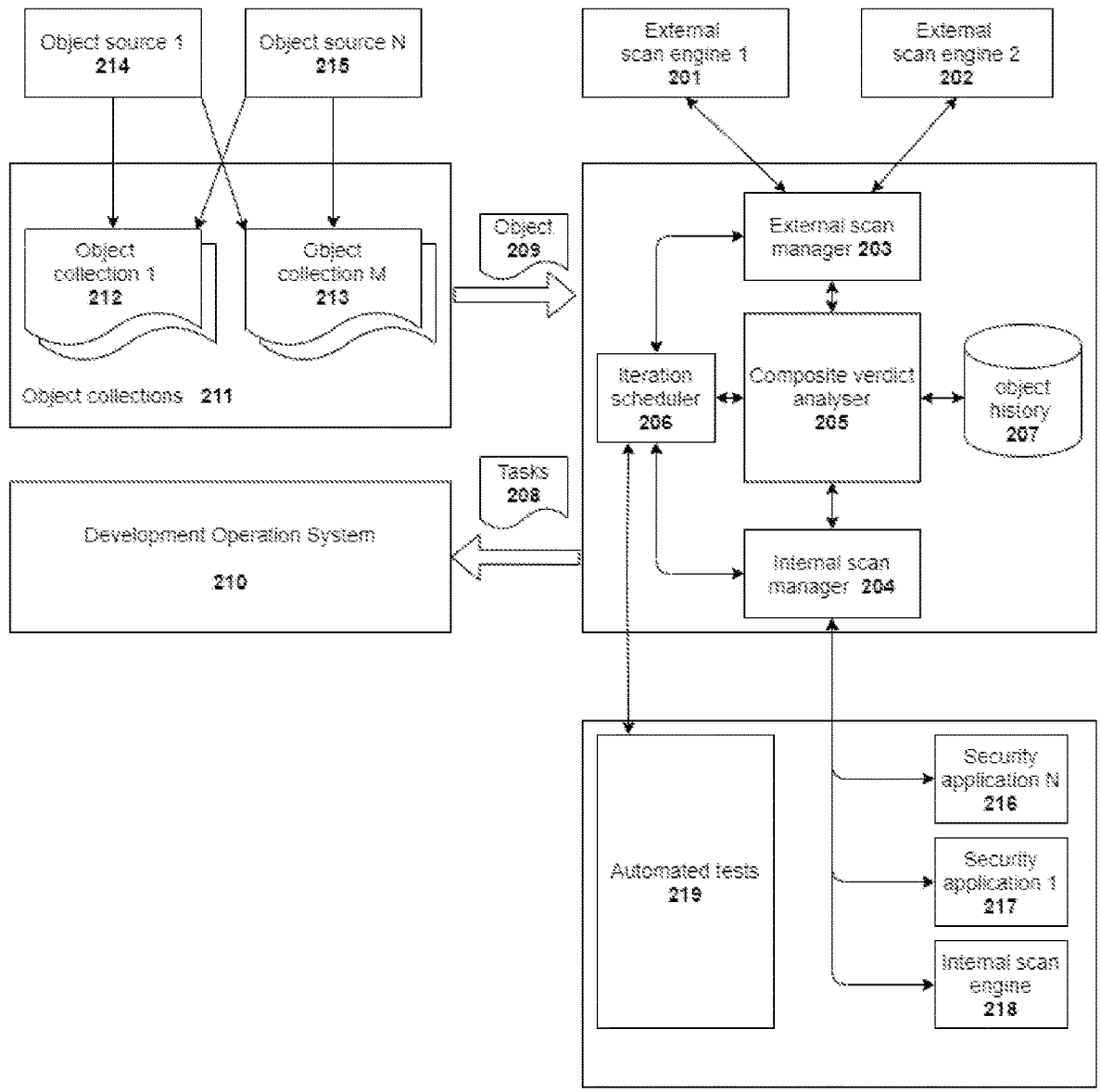
FIG. 2 shows an exemplary system for iteration of the detection quality assessment according to the exemplary embodiment.

FIG. 2 shows an exemplary system for the iteration of the detection quality assessment.

As shown in FIG. 2, the composite verdict analyzer 205 exchanges information with an iteration scheduler 206, an external scan manager 203, an internal scan manager 204, and object history 207, by receiving object 209 and generating task 208 that is provided to a development operation system 210.

The iteration scheduler 206 interacts with the external scan manager 203, the internal scan manager 204, and the automated tests 219.

More specifically, the iteration scheduler 206 controls the flow of the scanning during the iteration and scheduling the next iteration based on the composite verdict.

The internal scan manager 204 communicates with security applications 216 and 217, and internal scan engine 218 by sending commands or objects to internal scan engines or products to get current scan results, using API, command line, or other interfaces.

The external scan manager 203 communicates with external scan engines 201 and 202 by sending commands or objects to third-party tools and engines to get current scan results, using API, command line, or other interfaces.

The object 209 is provided from the object collections 211 that includes object collections 212 and 213 communicating with object sources 214 and 215. The object 209 may include files (e.g., scripts, exe files, documents, webpages etc.), URLs, IP addresses, domain names, etc.

In an exemplary aspect, the system shown in FIG. 2 includes a processor of a computer coupled to a memory storing instructions. The processor is configured to iteratively perform a dynamic assessment of a quality of a threat detection with a frequency defined for each of objects 209 in object collections 211.

A result of the dynamic assessment includes internal and external scan results of the objects, by internal scan engine 1 and external scan engine 2, respectively, and a consistency verdict of the internal and external scan results of the objects 209.

The system changes a frequency of scanning iteration of the objects 209 based on the consistency verdict of the external and internal scan results of the objects assessed by the composite verdict analyzer 205.

The system further classifies the objects 209 based on the result of the dynamic assessment, create a development task 208 including the internal and external scan results of the objects 209, meta-data of the objects, and automated test results to provide details for developing a software to fix inconsistency of the internal and external scan results of the objects.

The system also controls the dynamic assessment in accordance with a dynamic of implementation of the development task 208 and maintains the quality of the threat detection on a given level based on the controlled dynamic assessment and a priority of the development task 208.

Figure 3:
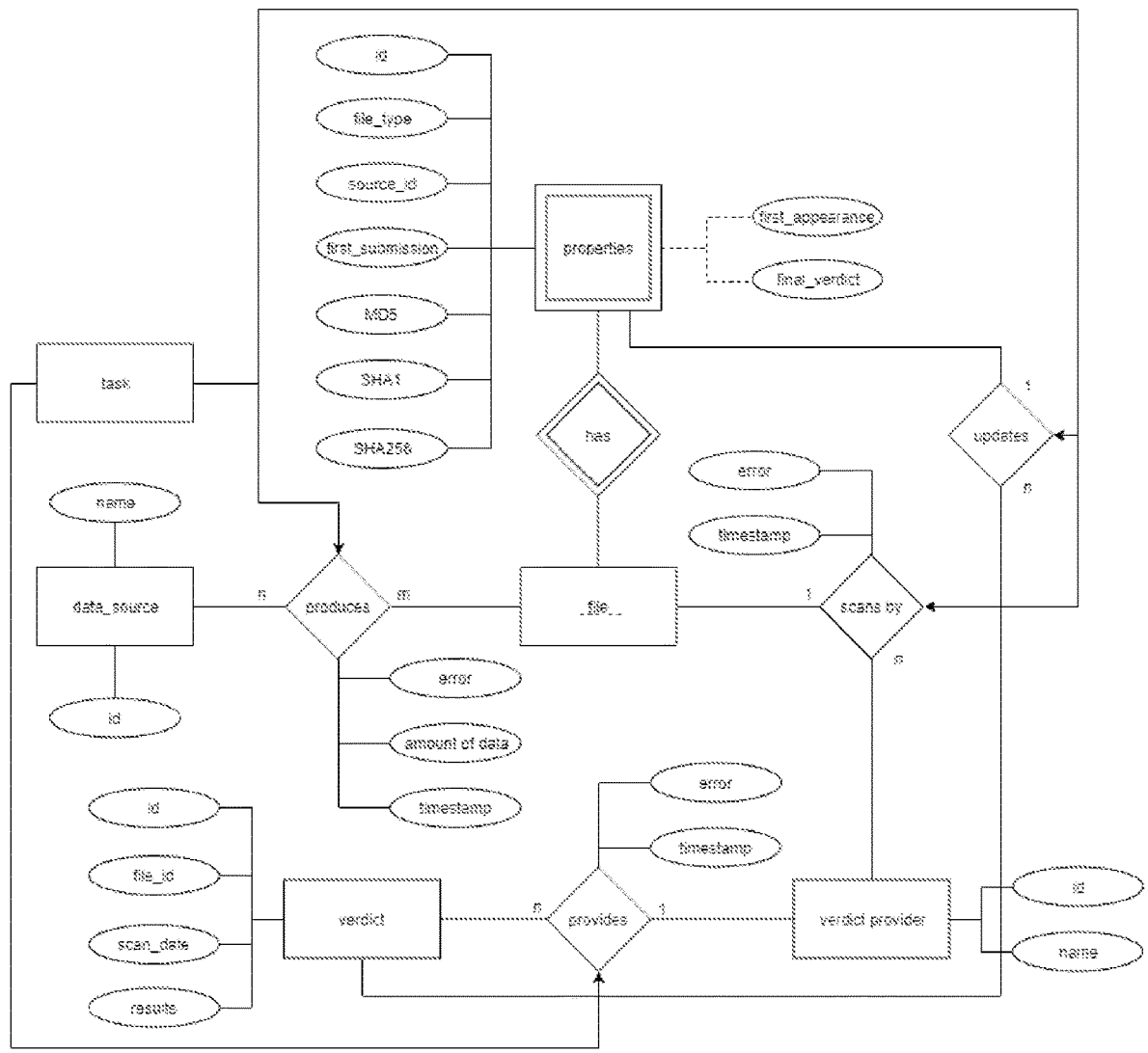
FIG. 3 shows an exemplary entity relationship diagram according to the exemplary embodiment.

FIG. 3 shows an exemplary entity relationship diagram for an exemplary malicious code detection quality control system for an antivirus engine.

In an exemplary aspect of the present invention, a system automatically receives information about malicious and clean files from various sources (e.g., VirusTotal feed, MalaShare, workstations, etc.). The system automatically classifies files into categories, for example, black, white, and gray, and allows to obtain a confusion matrix and its dependence on time for various verdict providers on different datasets.

Aggregation by file appearance and last scan dates, datasets and any combination of these parameters are available, and collection and storage of all historical information is provided (for example, as scan results). The system allows visualization of the metrics, and works in real time (i.e., behind by the time required for classification).

In the above-described process, as shown in the exemplary FIG. 3, the data source includes a resource or an object that allows to receive information about malicious and clean files, which preferably include new files. The dataset is obtained from a specific data source, and the verdict provider includes an antivirus engine installed on VirusTotal, BitDefender, CleanSet, or another source that provides useful information about the file. The task includes a program that performs some work including receiving new files, scanning, receiving verdicts, storing results into a database, etc., and the detection quality includes a confusion matrix value.

The entities shown in the exemplary FIG. 3 include data source, file, verdict provider, and verdict.

The data source has 2 attributes of id and name. It can produce files (e.g., only hashes are used) and fills in all required fields. One data source produces many files. At the same time one file can be produced by different data sources (i.e., ids vary).

File has properties. All required fields are filled in by data source, optional fields could be updated by verdicts. File could be scanned by different verdict providers.

Verdict Provider has 2 attributes of id and name, it provides verdicts. The temporal dependence of verdicts are considered, one file can be scanned several times to get several verdicts.

Verdict has 4 attributes that are filled by the verdict provider, including id, file_id, scan_date, and result.

Task controls all systems. Firstly, new files are produced by data sources. Then, among all files, the interested files are selected (e.g., new files that were received recently). After that the selected files are rescanned by verdict providers and new verdicts are received.

Figure 4:
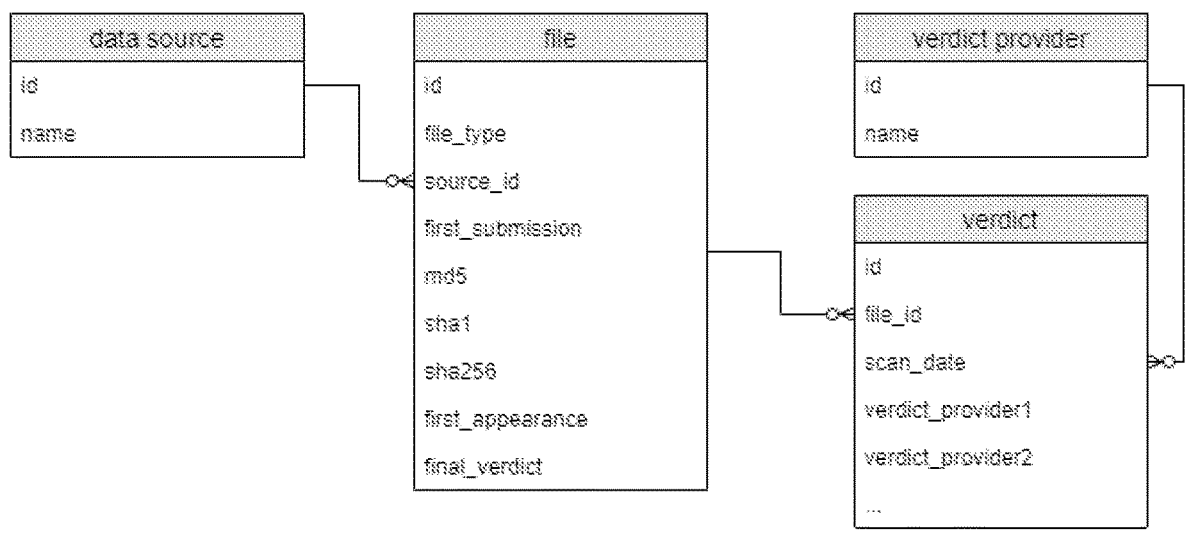
FIG. 4 shows an exemplary database schema according to the exemplary embodiment.

The entity relationship diagram shown in FIG. 3 more clearly shows the database schema of FIG. 4.

FIG. 4 shows existing tables and their fields, upon which the following aspects of the data sources, files, verdict providers, and verdicts can be presented.

Data Sources

Contains attributes of data sources.

| Name | Data type | Description |
| --- | --- | --- |
| id | INTEGER | Data source identifier, primary key, unique. |
| name | VARCHAR | A required unique field-data source name. |

Files

Contains attributes of data sources.

| Name | Data type | Description |
| --- | --- | --- |
| id | INTEGER | File identifier, primary key, unique. |
| file_type | VARCHAR | A required field. Describes file type. |
| source_id | INTEGER | A required field, source id, refers to the id field of the table data_sources. |
| first_submission | DATETIME | A required field, file receive time, sets by the data source. The time we received the file. |
| md5 | VARCHAR | A required field, files hashe, respectively. |
| sha1 | VARCHAR | A required field, files hashe, respectively. |
| sha256 | VARCHAR | A required field, files hashe, respectively. |
| first_appearance | DATETIME | An optional field, first appearance of a file in the VirusTotal system. |
| final_verdict | INTEGER | An optional field, the final verdict, based on the solution of the system. |

Verdict Providers

Contains attributes of verdict providers.

| Name | Data type | Description |
| --- | --- | --- |
| id | INTEGER | Verdict provider identifier, primary key, unique. |
| name | VARCHAR | A required unique field-verdict provider name. |

Verdicts

Contains attributes of verdicts.

| Name | Data type | Description |
| --- | --- | --- |
| id | INTEGER | Verdict identifier, primary key, unique. |
| file_id | INTEGER | A required field, file id, refers to the id field of the table files. |
| scan_date | DATETIME | A required field, scan time. |
| verdict_provider_name | INTEGER | An optional field, containing verdict. Each verdict provider has its own column. |

In an exemplary aspect, when creating the database, 4 empty tables are created. The table verdicts are created with 3 columns (id, file_id, and scan_date). When adding a record to the verdict_providers table, a column in the verdicts table with the corresponding name is created.

With regard to the component model, MDQCS includes the following components:

1. DataSources
2. VerdictProviders
3. DetectDB
4. Tasks

The following tables describe the responsibility of each component:

| Component name | Responsibility | Input | Output |
| --- | --- | --- | --- |
| Data-Sources | Gets a list of new files from data source | Valid authorization data (if required) | List of received files-hashes and receiving time |
| Verdict Providers | Scans specified files and provides reports | List of hashes | Reports |
| Detect DB | Responsible for storing all information (files and reports) | List of files or verdicts | — |
| Tasks | Launches other modules in the desired sequence and controls the entire workflow | Instances of the above modules | — |

Data Sources
Methods

| | |
| --- | --- |
| .produse( ) | Get a list of new files |
| .get_error( ) | Get errors |

Attributes

| | |
| --- | --- |
| name | Data source name |

Verdict Providers
Methods

| .scan( ) | Scans specified files and provides reports |
|---|---|
| .get_errors( ) | Get errors |

Attributes

| name | Verdict provider name |
|---|---|

Detect DB
Methods

| .open( ) | Open DB |
|---|---|
| .commit( ) | Commit changes |
| .create_DB( ) | Create DB if does not exist |
| .add_new_data_source( ) | Add new entry in data sources table |
| .add_new_verdict_provider( ) | Add new entry in verdict_providers table |
| .add_files( ) | Add new entries in files table |
| .add_verdicts( ) | Add new entries in verdicts table |
| .close( ) | Close connection. |

With regard to the metrics, the time of appearance can be considered as both the time of receipt by the system (i.e., first submission) and the time of appearance in the VT system (i.e., first appearance).

All metrics are calculated on:

| on various datasets | {dataset='dataset_name'} |
|---|---|
| on average on all datasets | {dataset='average'} |
| weighted average for all datasets | {dataset='weighted'} |

With regard to detection quality dependence on time, the detection quality is calculated on the day the file appears, the next day, and so on, up to the limit that is set.

Regarding averaging the previous metric over time for a specified period, the averaging detection quality for 0 day files, for files the next day, and so on may be considered.

Average detection quality for files is received in a specified period. The number of files from one source are known to another and how quickly do they appear depend on the following:

Local (white) files and BD cleanset;
MalShare and VT; and
Local files and VT.

The descriptions of the various exemplary embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

The invention claimed is:

1. A method of continuous development of an internal threat scan engine based on an iterative quality assessment, the method comprising:
    iteratively performing a dynamic assessment of a quality of a threat detection with a frequency defined for each of objects in an object collection, wherein a result of the dynamic assessment includes internal and external scan results of the objects and a consistency verdict of the internal and external scan results of the objects;
    changing a frequency of scanning iteration of the objects based on the consistency verdict of the external and internal scan results of the objects;
    classifying the objects based on the result of the dynamic assessment;
    creating a development task including the internal and external scan results of the objects, meta-data of the objects, and automated test results to provide details for developing a software to fix inconsistency of the internal and external scan results of the objects;
    controlling the dynamic assessment in accordance with a dynamic of implementation of the development task; and
    maintaining the quality of the threat detection on a given level based on the controlled dynamic assessment and a priority of the development task.

2. The method according to claim 1, wherein the frequency of scanning iteration of the objects changes when the objects include new files.

3. The method according to claim 2, wherein the frequency of scanning iteration of the objects further changes when the internal and external scan results of the objects differ.

4. The method according to claim 1, wherein, in the changing of the frequency of scanning iteration of the objects, when the objects are new files and internal and external scan results of the objects differ, the frequency of scanning iteration of the objects increases.

5. The method according to claim 1, wherein, when the internal and external scan results of the objects differ, the frequency of scanning iteration of the objects is more than the frequency of scanning iteration of the objects when the internal and external scan results of the objects are consistent.

6. The method according to claim 1, further comprising:
    before the changing of the frequency of scanning iteration of the objects, receiving information on the objects about malicious and clean files from various sources.

7. The method according to claim 1, wherein the internal and external scan results of the objects include file appearances, last scan dates, datasets, and historical information.

8. The method according to claim 1, wherein the objects are from collections of various sources with supported products and scanning engines.

9. The method according to claim 1, wherein the classifying of the objects includes comparing verdicts of the internal and external scan results of the objects with information of third-party scanning services about the objects.

10. The method according to claim 1, wherein the iteratively performing of the dynamic assessment continues by repetition to achieve a predetermined value for the quality of threat detection.

11. A system for continuous development of an internal threat scan engine based on an iterative quality assessment, the system comprising:
    a processor coupled to a memory storing instructions, the processor being configured to:

iteratively perform a dynamic assessment of a quality of a threat detection with a frequency defined for each of objects in an object collection, wherein a result of the dynamic assessment includes internal and external scan results of the objects and a consistency verdict of the internal and external scan results of the objects;

change a frequency of scanning iteration of the objects based on the consistency verdict of the external and internal scan results of the objects;

classify the objects based on the result of the dynamic assessment;

create a development task including the internal and external scan results of the objects, meta-data of the objects, and automated test results to provide details for developing a software to fix inconsistency of the internal and external scan results of the objects;

control the dynamic assessment in accordance with a dynamic of implementation of the development task; and maintain the quality of the threat detection on a given level based on the controlled dynamic assessment and a priority of the development task.

12. The system according to claim 11, wherein the processor changes the frequency of scanning iteration of the objects when the objects include new files.

13. The system according to claim 12, wherein the processor further changes the frequency of scanning iteration of the objects when the internal and external scan results of the objects differ.

14. The system according to claim 11, wherein, in the changing of the frequency of scanning iteration of the objects, when the objects are new files and internal and external scan results of the objects differ, the processor increases the frequency of scanning iteration of the objects.

15. The system according to claim 11, wherein, when the internal and external scan results of the objects differ, the frequency of scanning iteration of the objects is more than the frequency of scanning iteration of the objects when the internal and external scan results of the objects are consistent.

16. The system according to claim 11, wherein, before the changing of the frequency of scanning iteration of the objects, the processor receives information on the objects about malicious and clean files from various sources.

17. The system according to claim 11, wherein the internal and external scan results of the objects include file appearances, last scan dates, datasets, and historical information.

18. The system according to claim 11, wherein the objects are from collections of various sources with supported products and scanning engines.

19. The system according to claim 11, wherein the classifying of the objects includes comparing verdicts of the internal and external scan results of the objects with information of third-party scanning services about the objects.

20. The system according to claim 11, wherein the processor continues the iteratively performing of the dynamic assessment by repetition to achieve a predetermined value for the quality of threat detection.

* * * * *